UNITED STATES PATENT OFFICE.

ELLIS M. POTTER, OF NEW YORK, N. Y.

VEGETABLE COMPOUND FOR BEVERAGES AND PROCESS OF PRODUCING SAME.

1,150,303. Specification of Letters Patent. Patented Aug. 17, 1915.

No Drawing. Application filed April 20, 1914. Serial No. 833,105.

*To all whom it may concern:*

Be it known that I, ELLIS M. POTTER, a citizen of the United States, and a resident of New York, in the county of New York and State of New York, have invented a certain new and useful Vegetable Compound for Beverages and Process of Producing Same, of which the following is a description.

My invention is based primarily upon the discovery of a new method of treating a well-known vegetable product in such manner that a hitherto prohibitive material may now be utilized directly for beverages. Furthermore, the new product may be admixed with other well-known producing substances to modify the deleterious effects thereof.

The *Chichorium intybus* commonly called chicory has for many years been proposed and used to some extent as a substitute for coffee but for the most part has been used for blending with coffee. The *Chichorium intybus* is a well-known perennial herbaceous plant which has a distinctly bitter taste though devoid of any peculiar flavor and without acrimony. It resembles and is practically identical in its properties with taraxacum or the ordinary well-known dandelion. The bitter taste is strongest in the root and therapeutically is applicable to correct derangement of the hepatic and digestive organs. It has a marked beneficial effect in diseases of the liver and spleen, such as chronic congestion and inflammation. It is highly tonic in its effect, laxative and diuretic and undoubtedly enhances the activity of the liver through its hepatic influences. It promotes a secretion of the bile. It is also very effective in treatment of atonic dyspepsia and constipation due to torpidity of the liver as well as in catarrhal jaundice and hepatic congestion.

Heretofore the ordinary process of treating chicory has been to cut the green root into substantially equal sized pieces and then roast them until they lose approximately 140 out of 500 parts by weight. It has been common in practice to roast these roots substantially in the same manner and with the same sort of apparatus as that employed in roasting coffee, the temperatures ranging from 300 to 500 degrees Fahrenheit, the temperature and period of roasting being determined largely by the character of the material. When roasted brown such a root has been readily ground in a mill to any required fineness. The material thus produced has been used as a decoction and substitute for coffee and has also been mixed with coffee as a blend.

I have found that the active principles and constituents of the root are substantially the same as taraxacum or dandelion root and consists largely of resinous substances, a bitter principle which in somewhat concentrated solution may be precipitated by several alkaloidal solutions. This bitter principle undoubtedly is taraxacin. There is also a waxy substance which may be separated.

Ordinarily, chicory can be used only in moderate quantities as a blend in coffees and therefore its reactive or negative effect upon the alkaloid stimulant of coffee has been of almost unappreciable value.

If a sufficient quantity of roasted chicory is mixed with ground coffee, to produce a reactive effect of any value, the beverage is unpalatable and unfit for use.

I have found that by subjecting the *Chichorium intybus* to a treatment such as steaming and boiling prior to roasting that I retain its active therapeutic values and produce a material which, upon roasting and grinding, will provide a beverage of excellent flavor.

The material so produced may be used in many ways and the by-products secured under my process are also useful.

In treating the root, I use pieces of comparatively the same size and approximately the size of an apricot. A mass of this material is submerged and boiled for a period ranging from five to twenty minutes, the liquor being drawn off and a fresh supply of boiling water being added. The material is again submitted to a light boiling action and this process of boiling may be repeated as often as desired and to the extent necessary to properly remove the objectionable qualities. After the final boiling, all traces of the liquor are removed from the root by rinsing the same in clear water. The material is then dried at comparatively slow temperatures and is then roasted. The roasting process is practically the same as that employed for roasting coffee. The material is placed in cylinders heated internally or externally under temperatures varying from three to five hundred degrees Fahrenheit.

The inherent strong bitter qualities of the chicory are much lessened and other flavors are caused to predominate. The decoction made from the ground root thus prepared, provides a delicious beverage and the character of the material is such that it may be readily mixed and blended with coffee to such an extent as to neutralize the alkaloid stimulants of the coffee.

The liquor secured in the boiling process when concentrated by distillation or boiling appears to contain a glucoside having the general formula $C_{32}H_{34}O_{19}$. It is of a thick syrupy consistency, provides an excellent flavoring material for chocolate or may be blended to improve the drinking qualities of coffee and other like materials.

I make no claim herein to the beverage which may be produced by mixing the treated chicory with coffee and other substances, this being claimed in a co-pending application Serial No. 833,104, filed April 20, 1914, the invention herein relating to the new product of manufacture and the process or method of producing it.

What I claim as my invention and desire to secure by Letters Patent is:

1. The herein described roasted material, made from chicory and substantially free from the bitter principle thereof.

2. The herein described process of treating chicory which consists in boiling the chicory root removing the liquid residuum and subsequently drying and roasting the said root.

3. The herein described process of treating chicory which consists in boiling said root, cleansing it of its liquor by rinsing and subsequently drying and roasting said root.

4. A vegetable product consisting of dry and ground roasted chicory free from the bitter principle thereof.

5. Chicory free from the bitter principle thereof.

ELLIS M. POTTER.

Witnesses:
  PAULA DONAHUE,
  HELEN POTTER.